US008750287B2

(12) United States Patent
Bui et al.

(10) Patent No.: US 8,750,287 B2
(45) Date of Patent: Jun. 10, 2014

(54) TRAFFIC-ENGINEERED CONNECTION ESTABLISHMENT ACROSS RESOURCE DOMAINS FOR DATA TRANSPORT

(75) Inventors: Dinh Thai Bui, Nozay (FR); Helia Pouyllau, Nozay (FR)

(73) Assignee: Alcatel Lucent, Paris (FR)

( * ) Notice: Subject to any disclaimer, the term of this patent is extended or adjusted under 35 U.S.C. 154(b) by 247 days.

(21) Appl. No.: 13/265,963

(22) PCT Filed: Mar. 15, 2010

(86) PCT No.: PCT/EP2010/053244
§ 371 (c)(1),
(2), (4) Date: Nov. 15, 2011

(87) PCT Pub. No.: WO2010/127893
PCT Pub. Date: Nov. 11, 2010

(65) Prior Publication Data
US 2012/0051221 A1 Mar. 1, 2012

(30) Foreign Application Priority Data

May 6, 2009 (EP) ..................................... 09305402

(51) Int. Cl.
*H04L 12/28* (2006.01)
*H04L 12/56* (2006.01)

(52) U.S. Cl.
CPC ..................................... *H04L 45/52* (2013.01)
USPC ...................................... 370/351; 370/395.21

(58) Field of Classification Search
CPC ....................................................... H04L 45/52
USPC .............. 370/229–230, 230.1, 231, 235, 236, 370/254, 255, 351, 389, 392, 395.2, 395.21, 370/395.3, 395.5, 400, 401, 410
See application file for complete search history.

(56) References Cited

U.S. PATENT DOCUMENTS 7,593,340 B2 * 9/2009 Li et al. .......................... 370/235

(Continued)

FOREIGN PATENT DOCUMENTS

| EP | 1089517 | 4/2001 |
|---|---|---|
| EP | 1599000 | 11/2005 |

OTHER PUBLICATIONS

Douville, R et al; A Service Plane over the PCE Architecture for Automatic Multidomain Connection-Oriented Services; IEEE Communications Magazine; IEEE Service Center.
Piscataway, US; vol. 46, No. 6, Jun. 1, 2008; pp. 94-102; XP011227791; ISSN: 0163-6804.
Rosen, E. et al; Multiprotocol Label Switching Architecture; IETF Standard, Internet Engineering Task Force, IETF, CH, Jan. 1, 2001; XP015008814; ISSN: 0000-0003, p. 1-62.

(Continued)

*Primary Examiner* — Edan Orgad
*Assistant Examiner* — Curtis A Alia
(74) *Attorney, Agent, or Firm* — Carmen Patti Law Group, LLC

(57) ABSTRACT

A method for establishing a connection across resource domains comprises determining source and destination end-points for the connection; determining, by a service agent, a chain of adjacent service elements suitable for joining the source and destination end-points based on the identified edges; requesting, by the service agent, a first service provider associated to a service element in the chain to select a first connection segment embodying the service element; receiving, by the service agent, an inter-carrier communication resource identifier from the first service provider, the inter-carrier communication resource identifier indicating communication resources at an inter-carrier interface between an end point of the first connection segment and a resource domain associated to an adjacent service element in the chain; and transferring, by the service agent, the inter-carrier communication resource identifier to a second service provider associated to the adjacent service element.

14 Claims, 3 Drawing Sheets

(56) References Cited

U.S. PATENT DOCUMENTS

| | | | |
|---|---|---|---|
| 7,706,344 B2* | 4/2010 | Kobayashi et al. | 370/338 |
| 8,374,092 B2* | 2/2013 | Previdi et al. | 370/237 |
| 2002/0156914 A1* | 10/2002 | Lo et al. | 709/238 |
| 2004/0215787 A1* | 10/2004 | Gibson et al. | 709/227 |
| 2008/0069010 A1* | 3/2008 | Zhang | 370/254 |
| 2008/0172732 A1* | 7/2008 | Li et al. | 726/15 |

OTHER PUBLICATIONS

Pekhter, Y. et al; Carrying Label Information in BGP-4; IETF Standard, Internet Engineering Task Force, IETF, CH, May 1, 2001; XP015008888; ISSN: 0000-0003; p. 1-9.

* cited by examiner

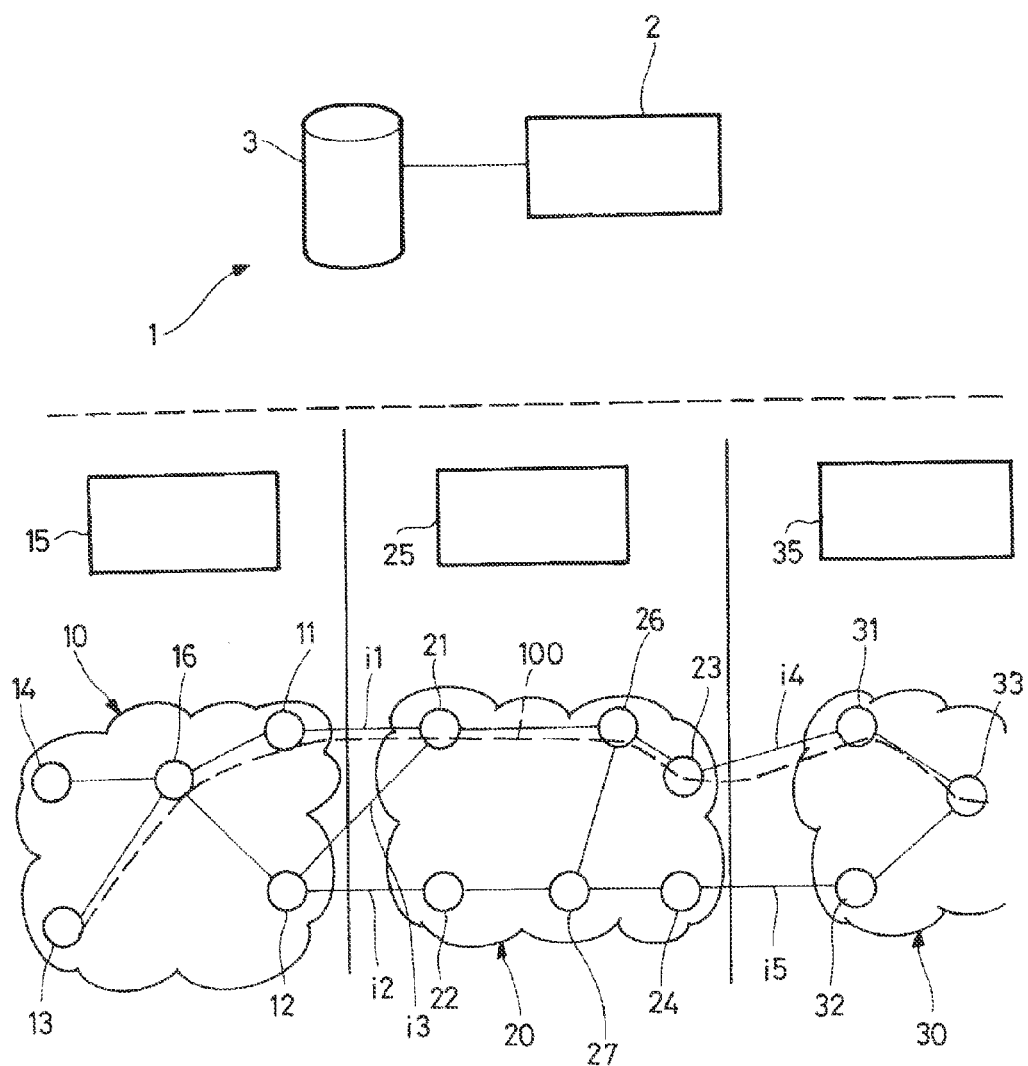
FIG_1

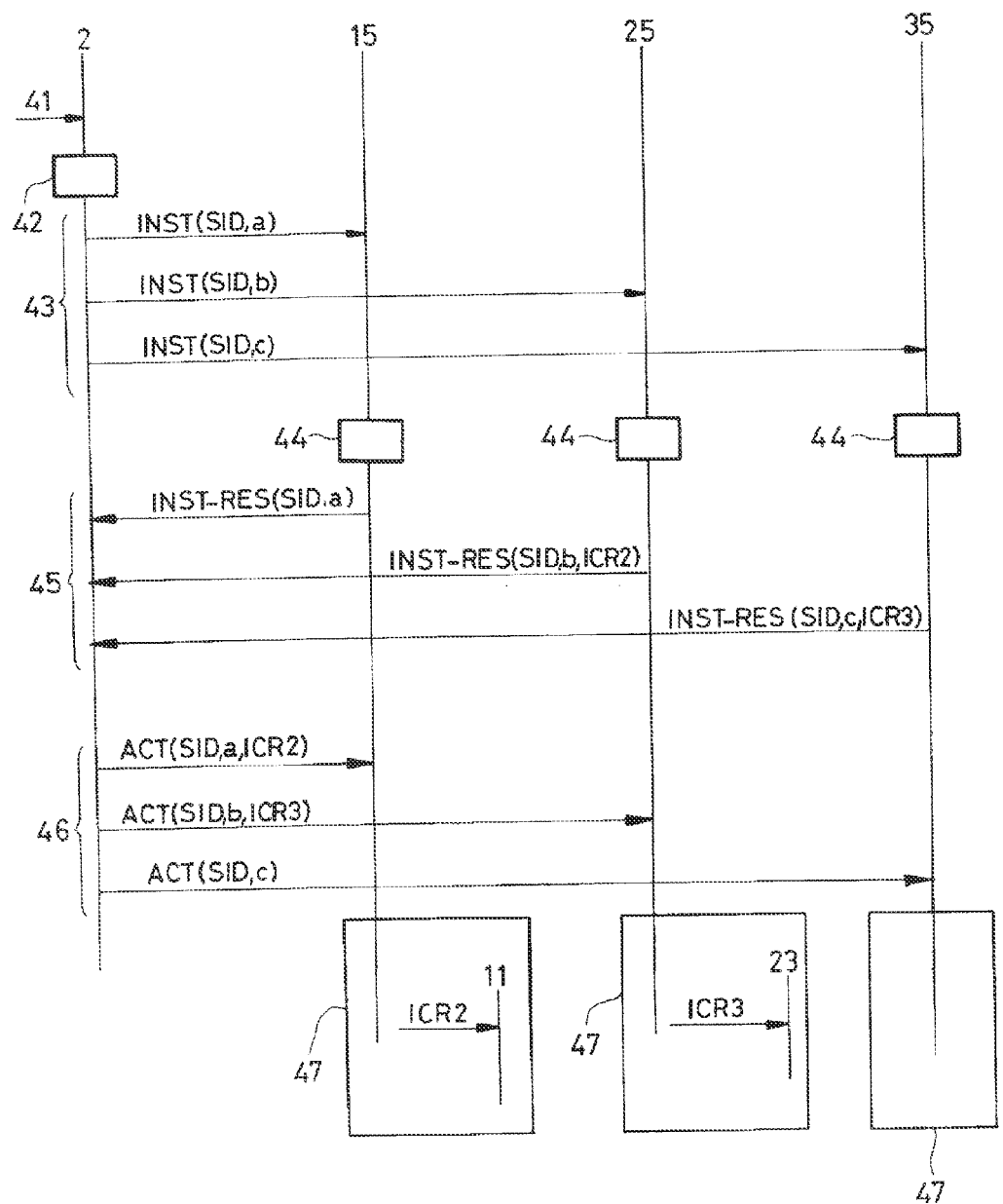

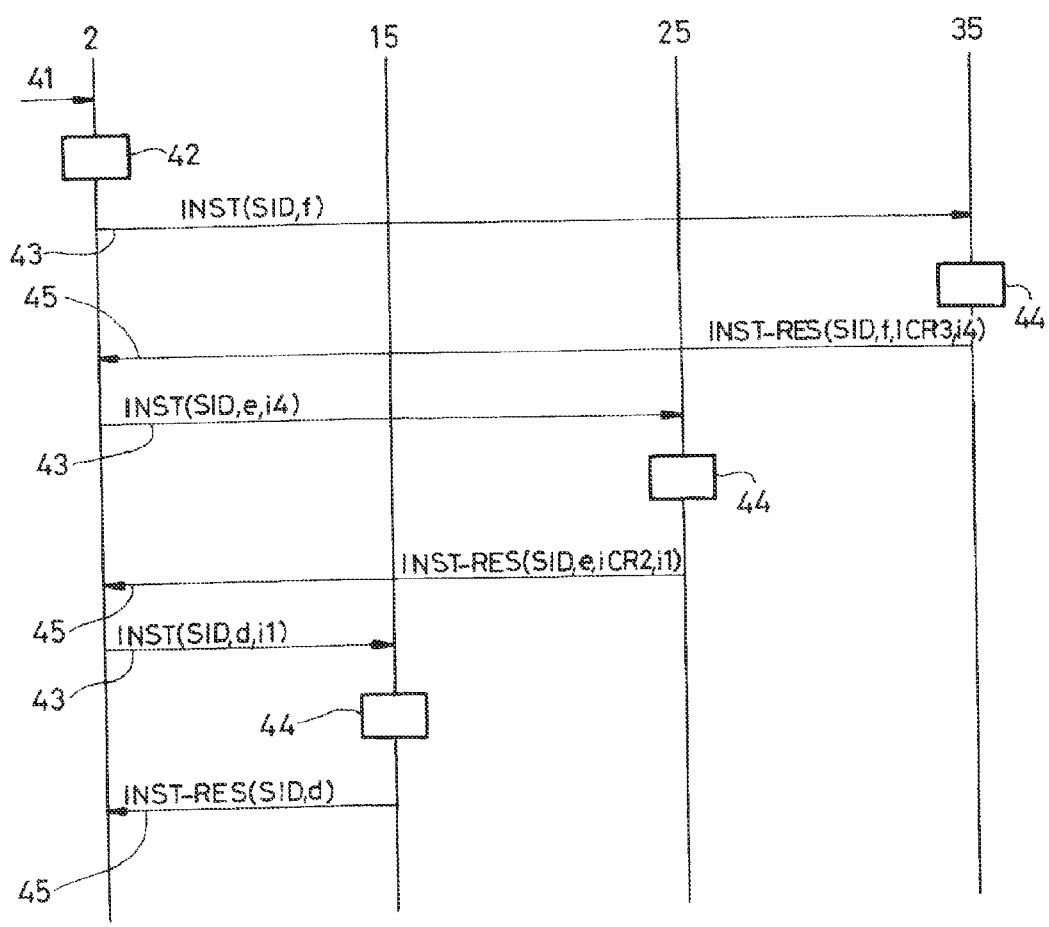

US 8,750,287 B2

TRAFFIC-ENGINEERED CONNECTION ESTABLISHMENT ACROSS RESOURCE DOMAINS FOR DATA TRANSPORT

FIELD OF THE INVENTION

The invention relates to the technical field of inter-carrier telecommunications, i.e. telecommunications involving multiple service providers. More precisely, the invention relates to traffic-engineered connections across multiple resource domains owned by multiple service providers.

BACKGROUND OF THE INVENTION

Telecommunication service providers are able to provide data services across their networks. For example, data services include multimedia connection services, synchronization distribution and signalling. In order to increase the area over which data may be transmitted, service providers can contract data transport services from other service providers. For example, a service provider who wishes to provide global IP virtual private network (VPN) services might contract transport services from access providers to reach enterprise sites that are not directly connected to the service provider's domain.

With an increased need for fast service delivery, service providers have an incentive to establish a cross-provider service layer that allows them to interact and buy each other's services through an automated process. An implementation of such service layer among an alliance of service providers has been proposed for example by Douville et al. in "A Service Plane over the PCE Architecture for Automating Multi-domain Connection-Oriented Services", IEEE Communications Magazine, June 2008, pp 94-102.

SUMMARY OF THE INVENTION

In an embodiment, the invention provides a method for establishing a traffic-engineered connection across resource domains for data transport, each of the resource domains being owned by an associated service provider, the method comprising:
determining, by a service agent, source and destination endpoints for the connection,
receiving, by the service agent, a service element from each of the service providers, the service element identifying edges of a resource domain owned by the associated service provider and connectivity attributes specifying connectivity provided by the service provider between said edges,
determining, by the service agent, a chain of adjacent service elements suitable for joining the source and destination endpoints based on the identified edges,
requesting, by the service agent, a first service provider associated to a service element in the chain to select a first connection segment embodying the service element,
receiving, by the service agent, an inter-carrier communication resource identifier from the first service provider, said inter-carrier communication resource identifier indicating communication resources at an inter-carrier interface between an end point of the first connection segment and a resource domain associated to an adjacent service element in the chain,
transferring, by the service agent, the inter-carrier communication resource identifier to a second service provider associated to the adjacent service element.

The inter-carrier communication resource identifier indicates communication resources at an inter-carrier interface that make it possible to concatenate two intra-domain connection segments embodying adjacent service elements in the chain. In embodiments, such concatenation is achieved by transferring the resource identifier through a service layer without relying on signalling protocols, which avoids using signalling protocols at inter-carrier interfaces. Hence, issues related to signalling message exchange between different domains can be avoided, such as inter-operability between the protocol stacks of each domain or policy rule synchronization between the domains.

In accordance with embodiments, the method may comprise one or more of the following features.

In an embodiment, the inter-carrier communication resource identifier is sent to the service agent within a confirmation message indicating an availability of the first connection segment.

In an embodiment, the inter-carrier communication resource identifier is transferred by the service agent within an activation request for requesting the second service provider to establish a second connection segment embodying the adjacent service element.

In an embodiment, the first service provider selects the first connection segment among a set of pre-computed connection segments embodying the service element. In an embodiment, for each of the service element exposed by a service provider to the service agent, the service provider pre-computes and stores one or more connection segments suitable for embodying the service element. This embodiment allows to speed up the connection segment selection. Some or all of the service providers can operate in this way.

In embodiments, the inter-carrier communication resource identifier may comprise, but is not limited to, any of the following information:
  a Multi-Protocol Label Switching (MPLS) label,
  a Generalized MPLS (GMPLS) label,
  a class of DiffServ (as per RFC3260),
  a couple (MPLS or GMPLS label, IP address),
  a couple (MPLS or GMPLS label, interface ID),
  a couple (GMPLS label, GMPLS Explicit Route Object),
  an n-tuple of data allowing to identify network resources between two adjacent carriers.

In an embodiment, the service agent determines desired performance parameters for the connection and determines the chain of service elements as a function of the connectivity attributes of the service elements so as to match the desired performance parameters. Such performance parameters may include bandwidth, delay, transmission protocols, transport protocols and others.

In an embodiment, the service agent determines a service identifier for the connection and communicates the service identifier to the service providers associated to the service elements in the chain and the service providers associate the service identifier to connection segments embodying the service elements.

Service element edges may be specified in diverse ways. In embodiments, service element edges are identified at a detailed level, e.g. at border node level or inter-carrier interface level. With such detailed service element edges, it may be possible to ascertain the existence of one or more inter-carrier interfaces between service element edges even before the service elements are instantiated and an intra-domain path of a connection segment is selected (e.g. during the composition phase).

In a corresponding embodiment, service element edges are identified as border nodes and the service agent determines the chain of adjacent service elements as a function of border node adjacencies. In this embodiment, border nodes at the edges of a service element are specified in the service element and adjacencies between the border nodes of the respective service elements are taken into account by the service agent. For example, information about border node adjacencies can be made available to the service agent in diverse manners, e.g. through exterior gateway protocol engines such as BGP, or configuration files or in the service elements.

Embodiments with detailed service element edges make it possible to select multiple connection segments embodying multiple service elements of the chain in parallel with some guarantee that the resulting connection segments will be connectable through an inter-carrier interface between end points of the resulting connection segments, e.g. border nodes of the associated resource domains. In a corresponding embodiment, the service agent requests in parallel the first service provider associated to a service element in the chain and the second service provider associated to an adjacent service element in the chain to select respective connection segments between the border nodes identified in the respective service elements.

In alternative embodiments, service element edges may be specified at a more abstracted level, e.g. at a domain level. In a corresponding embodiment, service element edges are identified as neighbour resource domains. Such abstraction may improve confidentiality of topology information relative to each resource domain. Moreover, service element edges specified as neighbour resource domains allow for more flexibility in the connection path computation since any of the border nodes interfacing with the cited neighbour resource domain can be considered for establishing a connection segment embodying the service element.

In such abstracted service element edges, the service agent may not be able to define the end points of a connection segment already at the step of determining the chain of adjacent service elements (i.e. composition step). Therefore, an issue arises to ascertain the existence of an inter-carrier interface between the respective connection segments. In embodiments, the first and second connection segments are selected in a sequential manner so as to satisfy this constraint.

In a corresponding embodiment, the service agent transfers the inter-carrier communication resource identifier to the second service provider within a request for selecting a second connection segment embodying the adjacent service element in the chain, and the second service provider selects the second connection segment as a function of the inter-carrier communication resource identifier so that the second connection segment ends at the inter-carrier interface indicated by the inter-carrier communication resource identifier.

The invention provides also a service agent for establishing a traffic-engineered connection across resource domains for data transport, each of the resource domains being owned by an associated service provider, the service agent comprising a processing module adapted to:

determine source and destination end-points for the connection, receive a service element from each of the service providers, the service element identifying edges of a resource domain owned by the associated service provider and connectivity attributes specifying connectivity provided by the service provider between said edges, determine a chain of adjacent service elements suitable for joining the source and destination end-points based on the identified edges, request a first service provider associated to a service element in the chain to select a first connection segment embodying the service element, receive an inter-carrier communication resource identifier from the first service provider, said inter-carrier communication resource identifier indicating communication resources at an inter-carrier interface between the first connection segment and a resource domain associated to an adjacent service element in the chain, and transfer the inter-carrier communication resource identifier to a second service provider associated to the adjacent service element.

The invention provides also a service provider system for a service provider owning a resource domain and participating in a service provider alliance to establish inter-domain connections through the resource domain, the service provider system comprising:

an interface for communicating with a service agent, a control module adapted to detect an instantiation request comprising a service element identifier and a service identifier, select a connection segment embodying the service element within the resource domain, select an inter-carrier interface at an end point of the connection segment, reserve a communication resource at the inter-carrier interface, and communicate an inter-carrier communication resource identifier indicating the communication resources to the service agent in response to the instantiation request.

The invention provides also a service provider system for a service provider owning a resource domain and participating in a service provider alliance to establish inter-domain connections through the resource domain, the service provider system comprising:

an interface for communicating with a service agent, a control module adapted to detect an activation request comprising an inter-carrier communication resource identifier and a service identifier, determine a connection segment associated to the service identifier, said connection segment disposed within the resource domain, and concatenate the connection segment with a communication resource at an inter-carrier interface indicated by the inter-carrier communication resource identifier.

Aspects of the invention are based on the observation that configuring inter-carrier connections through an abstracted service layer involves multiple communications between service providers, i.e. domain owners and a service agent in charge of composing a service from multiple elements. Aspects of the invention result in an efficient use of such communications to achieve inter-carrier connection establishment in a fast, reliable and/or secure way.

BRIEF DESCRIPTION OF THE DRAWINGS

These and other aspects of the invention will be apparent from and elucidated with reference to the embodiments described hereinafter, by way of example, with reference to the drawings.

FIG. 1 illustrates a system in accordance with an embodiment of the invention.

FIG. 2 illustrates a connection establishment in accordance with an example embodiment.

FIG. 3 illustrates a connection establishment in accordance with another example embodiment.

DETAILED DESCRIPTION OF THE PREFERRED EMBODIMENTS

A connection refers to a communication channel through a communication system. A path refers to a sequence of links and nodes suitable for communication. A path is usually one attribute of a connection among others. However, the term "path" is sometimes used to refer to a connection itself.

Referring to FIG. 1, multiple service providers participate in an alliance to provide data transport services with inter-domain reach. Each service provider owns and operates a collection of network elements that will be referred to as the resource domain of the service provider. Resource domains are schematically illustrated at numerals 10, 20 and 30. Topology and size of the shown resource domains are chosen arbitrarily for the purpose of illustration. A resource domain may correspond to a standardized domain such as Autonomous System, Interior Gateway Protocol routing area, GMPLS overlay network, or to a plurality of such standardized domains under the responsibility of a single service provider. Herein below, the same numeral will be used to refer both to the service provider and to the associated resource domain. Examples of network elements include a transport network nodes, access network nodes connected to residential subscribers in an area, content servers, caching devices, billing systems and authentication systems.

Some border nodes in the resource domains of the alliance are interconnected through inter-carrier interfaces so that connections can be established across multiple domains. An inter-carrier interface (ICI) is a physical interface between the resource domains of two service providers. More specifically, an ICI is a direct physical interface between two network elements that are owned and operated by two different service providers. In FIG. 1, the ICI i1 links border node 11 in domain 10 to border node 21 in domain 20, the ICI i2 links border node 12 in domain 10 to border node 22 in domain 20 and the ICI i3 links border node 12 in domain 10 to border node 22 in domain 20. Similarly, two ICIs i4 and i5 exist between domain 20 and domain 30.

Each of the service providers 10, 20 and 30 of the alliance manages its own domain with an associated service provider system shown at numerals 15, 25 and 35. The service provider systems 15, 25 and 35 interact through a service layer that is illustrated schematically at numeral 1 so as to configure and manage inter-domain connections under the supervision of a service agent 2, as will be described herein below. The service provider systems 15, 25 and 35 may also include conventional intra-domain management functionality such as connection management, resource management, topology discovery, and other. A service provider system may be implemented in a centralized or distributed manner. FIG. 1 is only intended to give a high-level functional view of the system sufficient to understand example embodiments of the invention.

Each service provider 10, 20 or 30 of the alliance may offer services, such as data transport services or content distribution to other service providers. Service providers of the alliance advertise service through service elements, which is a standardized data structure. By comparing service elements, the service agent 2 can select which service elements work best to provide an end-to-end transmission. Service elements comprise imprecise Traffic Engineering information, i.e. information that a service provider is willing to share with other service providers within the alliance.

The service agent 2 is an agent of the service layer, which does end-to-end service composition for end-customers of the alliance. The service agent 2 may be a different entity from the service providers 10, 20 and 30. For example, the service agent 2 may be created as a third party intended to make critical decisions regarding the composition of inter-carrier services in a neutral and unbiased manner with respect to all service providers of the alliance.

When one of the service providers 10, 20 or 30 offers transit functionality to the other service providers, that service provider publishes a service element that is made accessible to service agent 2. For example, in FIG. 1, the service providers 10, 20 and 30 upload service elements into a data repository 3, which can be organized as a service element directory. Diverse implementations suitable for such a service element directory are described in "Vue d'ensemble des mécanismes d'annuaire et de leur applicabilité aux services inter-opérateurs" A. Santin and H. Pouyllau, Acte des JDIR'09: 10 èmes Journées Doctorales en Informatique et Réseaux, pp 13-18.

Alternatively, the service agent is a role that any service provider participating in the alliance may take. For example, when a service provider wants to offer a service to the service provider's residential or enterprise customers for whom the service provider needs to subcontract service from other service providers, the service provider may become the service agent which buys service elements from other service providers of the alliance. In such case, every service provider who is a member of the alliance may receive the service elements. However, it is possible for a service provider to publish service elements only to a subset of the service providers in the alliance.

Each of the service providers 10, 20 and 30 may publish a service element periodically, when an associated element is updated, when a malfunction in one of the associated resource domains 10, 20 and 30 occurs, and when the service provider 10, 20 or 30 receives a request to publish the service element from the service agent 2.

Each of the service providers 10, 20 and 30 publishes in its service elements the connectivity attributes the service provider offers between identified edges. The service element identifies connectivity attributes across the associated resource domain. The service element identifies the pairs of adjacencies between which the service provider provides connectivity with the associated connectivity attributes. The connectivity attributes may include transmission protocols, including adaptation functions, if appropriate; commercial terms, such as price; service level agreement parameters, such as delay; and regulatory constraints. Further details about service elements can be found in "A Service Plane over the PCE Architecture for Automating Multidomain Connection-Oriented Services", IEEE Communications Magazine, June 2008, pp 94-102.

In the example illustrated in FIG. 1, the service provider 20 could publish the following service elements:

1. node 21-node 23:
    Transmission protocol: Ethernet
    Commercial terms
    Regulatory constraints
    SLA-related parameters Example 1 illustrates a service element with edges defined at border node level.

2. domain 10-domain 30:
    Transmission protocol: MPLS
    Commercial terms
    Regulatory constraints
    SLA-related parameters Example 2 illustrates a service element with edges defined at neighbour domain level.

3. interface i2-interface i5:
    Transmission protocol: MPLS
    Commercial terms
    Regulatory constraints
    SLA-related parameters Example 3 illustrates a service element with edges defined at inter-carrier interface level.

The service agent 2 communicates with, and therefore, may receive published service elements from, the service providers 10, 20 and 30. Based on the received service element identifying the connectivity services, the service agent 2 may select an end-to-end connection path matching a connection request from an end-customer. To select an end-to-end connection path, the service agent 2 uses a two step process. The first step, referred to as composition, includes selecting a chain of service elements from the respective service providers to be involved in the requested inter-carrier connection. The second step, referred to as instantiation, includes selecting a path inside the selected resource domains. The ICIs to be used between the respective intra-domain connection segments may be selected in the first or second step, depending on the manner in which service element edges are defined.

The first step is a high-level path selection. Based on the edges and associated connectivity attributes in the service elements published by the service providers in the alliance system, service agent 2 selects the resource domains to use for transmitting data as the high-level path selection. For example, service agent 2 may select a path based on the transmission protocol and cost. The second step is a detailed-level path selection that the service agent 2 executes in cooperation with the respective service providers.

Example embodiments of processes for establishing an inter-carrier connection in the system of FIG. 1 will be described below. In the following description, the operations mentioned, e.g. shown in the flowchart of FIG. 2 or 3, may be implemented as program modules or functional processes including routines, programs, objects, components, data structures, etc., that perform particular tasks or implement particular abstract data types and may be executed using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

With reference to FIG. 2, at step 41, the service agent 2 receives a request for establishing an inter-carrier connection, e.g. from an end-customer. The request specifies characteristic features of the connection to be established, including source end-point or end-points, destination end-point or end-points and traffic-engineering requirements, if any e.g. bandwidth, delay, transmission protocol or other.

At step 42, the service agent 2 retrieves service elements from data repository 3 and selects service elements adapted to fulfill the request. More precisely, service agent 2 composes a chain of adjacent service elements in view of the edges indicated in the service elements and knowledge of inter-carrier interfaces between the resource domains. If the request specifies further traffic-engineering requirements, SLA-related parameters specified in the service elements are taken into account in the composition step to prune service elements that may not meet the specified traffic-engineering requirements.

In the embodiment of FIG. 2, the composition step 42 is assumed to yield a chain of service elements that already specifies the ICIs which will be used by the connection. Namely, service elements with edges specified at ICI level have been selected, or service elements with edges specified at border node level have been selected and the service agent 2 knows the inter-carrier interfaces that connect the border nodes.

To illustrate such a situation, the following example is proposed:
Request:
Source=node 13 in domain 10, Destination=node 33 in domain 30
Selected chain of service elements:
  a. Element published by provider 10: Edges=node 13-node 11, SLA-related parameters suitable for the request.
  b. Element published by provider 20: Edges=node 21-node 23, SLA-related parameters suitable for the request.
  c. Element published by provider 30: Edges=node 31-node 33, SLA-related parameters suitable for the request.

In the composition step, service agent 2 takes into account the existence of ICIs i1 and i4 to determine that the selected service elements are actually adjacent. At step 42, service agent 2 also allocates an identifier SID to the connection request. This identifier can then be used in all transactions related to the request.

At step 43, service agent sends an instantiation request INST to all service providers involved in the selected chain of service elements. The instantiation request INST comprises the identifier SID and an identifier of the respective service element to be instantiated by the service provider system, namely a, b and c in the illustrated example.

At step 44, upon receiving the instantiation request, a service provider system instantiates the identified service element. Namely, the service provider system determines a specific intra-domain connection path that embodies the connectivity attributes specified in the service element between the edges specified in the service element. The connection paths selected at step 44 represent respective segments of the end-to-end connection that will be finally established when the process completes successfully. At step 44, diverse modules of the service provider system may be involved, e.g. path computation elements or routers.

For example, at step 44, service provider system 15 selects a path through nodes 13, 16 and 11; service provider system 25 selects a path through nodes 21, 26 and 23; and service provider system 35 selects a path through nodes 31 and 33.

Also at step 44, each service provider system or at least one of the provider systems receiving an instantiation request selects and reserves a communication resource at an ICI located at an end of the selected connection path, e.g. at the ingress end. For example, service provider system 35 reserves resources identified by an identifier ICR3 at ingress ICI i4 and service provider system 25 reserves resources identified by an identifier ICR2 at ingress ICI i1.

Then, at step 45, each service provider system sends an instantiation response INST-RES to the service agent 2 to indicate that the instantiation of the respective service element has completed successfully. When inter-carrier communication resources have been reserved by a service provider system at step 44, an identifier of the communication resources is also included in the instantiation response. In the illustrated example, at step 45, system 25 transmits an instantiation response comprising identifier ICR2 and system 35 transmits an instantiation response comprising identifier ICR3.

If a service provider system could not instantiate a service element at step 44, e.g. due to lack of resources, then the instantiation response INST-RES would indicate this, e.g. by means of a specific object or field or message type. Then the process could crank back to step 42 to try a different chain of service elements.

At step 46, upon receiving the instantiation responses INST-RES, service agent 2 sends an activation request ACT to each of the service providers involved in the chain to have the service providers activate the selected connection segments. In addition, service agent 2 forwards each inter-carrier communication resource identifier received at step 45 to the corresponding neighbour service provider system to have the service providers concatenate the respective connection segments using the identified communication resources. An inter-carrier communication resource identifier may be forwarded within the activation request or in a separate message.

At step 47, each service provider system receiving an activation request configures the nodes along the path to establish the connection segment within the associated resource domain. This may be accomplished using diverse techniques, e.g. distributed processes such as RSVP-TE signalling or centralized processes such as node configuration by a central network management device. Each service provider system also forwards the inter-carrier communication resource identifier received at step 46, if any, to a corresponding edge node of the resource domain, for the edge node to concatenate the intra-domain connection segment with the subsequent connection segment established in the neighbour resource domain. Namely, in the illustrated example, service agent 2 forwards identifier ICR2 to service provider system 15 at step 46 and service provider system 15 forwards identifier ICR2 to edge node 11 at step 47, for edge node 11 to concatenate the connection segment with the identified resources on ICI i1.

At step 44, the inter-carrier communication resources identified by identifier ICR2 have been reserved for edge node 21 to receive traffic. Hence edge node 21 is already prepared to receive traffic using the reserved resources. Then upon receiving identifier ICR2, edge node 11 gets prepared to send traffic using the reserved resources. Hence concatenation of the respective connection segments can be achieved without exchanging further signalling messages between edge nodes 11 and 21. A similar result is obtained between edge nodes 23 and 31. Hence, the resulting end-to-end inter-carrier connection 100 is fully established when step 47 is completed.

According to embodiments, the communication resources at the ICI may encompass various types of resources, depending on the physical layer or layers implemented at the inter-carrier interface. A communication resource can include a physical port or a physical medium connected to a port, such as an optical fibre, a waveguide, a coaxial cable, or an electrical cable or wire. A communication resource can include an electromagnetic link, such as a radio link or a microwave link, or a frequency channel or a set of frequency channels on an electromagnetic link. A communication resource can include an optical link, in any part of the spectrum, e.g. visible, infrared or ultraviolet, or a wavelength channel or a set of wavelength channels on an optical link. A communication resource can include a timeslot or a set of timeslots on a TDM link, such as an optical link or a radio link or other electromagnetic links. A communication resource can include a channel code of a Code Division Multiple Access link. Various types of information may serve to identify a communication resource, depending on the type of the resource to be identified. The information in the instantiation response should identify the communication resource at the inter-carrier interface in a way that enables the neighbour service provider to concatenate the connection segments through the identified communication resource. For that purpose, the communication resource identifier can be selected from a group comprising an MPLS or GMPLS Label, a physical link identifier, e.g. an IP address or an IP prefix or a link number having local significance at a network element, a channel identifier, e.g. for identifying a electromagnetic channel, a radio frequency channel, an optical wavelength channel or other, and a channel identifier identifying a channel or set of channels in a multiplex, e.g. a timeslot in a TDM signal or a wavelength in a WDM signal.

Accordingly, depending on the transmission techniques used in the data plane, concatenating the respective connection segments may involve various operations at the edge nodes, including configuring an MPLS forwarding table, configuring an electronic or optical switch matrix and others.

In the above example, service provider systems operate during an instantiation step to reserve a communication resource at an ICI located at an ingress interface of the associated resource domain. However, a similar process can be implemented wherein service provider systems operate to reserve a communication resource at an ICI located at an egress interface of the associated resource domain. Alternatively, a service provider system instantiating a transit service element may reserve communication resources at ICIs located at both ends of the connection path across the associated resource domain. Those alternative embodiments provide similar advantages in terms of speeding up the connection establishment and/or avoiding signalling transactions at inter-carrier hops.

In the example of FIG. 2, it is assumed that the edge nodes of the connection path are specified in the service elements selected at step 42. Therefore, inter-carrier communication resources identifiers carried in messages INST-RES and ACT are implicitly referring to those edge nodes. Alternatively, those messages may explicitly specify an edge node to which an inter-carrier communication resource identifier relates. For example, at step 45, service provider system 25 sends an instantiation response comprising both identifier ICR2 and an identifier for edge node 21, e.g. an IP address. Explicit identification of the edge nodes in the service layer messages is even more useful in embodiments in which the edge nodes of the connection path are not specified in the service elements selected at step 42. This situation will be illustrated with reference to FIG. 3.

In FIG. 3, the same reference numerals as in FIG. 2 are used to refer to identical or similar steps and elements. Therefore, mostly differences with the process of FIG. 2 are highlighted below.

In the embodiment of FIG. 3, the composition step 42 is assumed to yield a chain of service elements that does not specify the ICIs which will be used by the connection. Namely, service elements with edges specified at domain level have been selected. To illustrate such a situation, the following example is proposed:
Request:
  Source=node 13 in domain 10, Destination=node 33 in domain 30
Selected chain of service elements:
  d. Element published by provider 10: Edges=node 13-domain 20, SLA-related parameters suitable for the request.
  e. Element published by provider 20: Edges=domain 10-domain 30, SLA-related parameters suitable for the request.
  f. Element published by provider 30: Edges=domain 20-node 33, SLA-related parameters suitable for the request.

In this case, the instantiation step in each resource domain is performed sequentially, e.g. from egress to ingress as illustrated or the other way around, to ensure the existence of ICIs interconnecting the respective connection segments.

At step 44, service provider system 35 selects a connection path that interfaces with the specified edge of the service element f i.e. domain 20. For example, service provider system 35 selects a connection path that ends at ingress ICI i4. At step 45, service provider system 35 sends an instantiation response that specifies both the selected ingress ICI, namely i4 and the selected resource identifier on the ingress ICI, namely ICR3.

At step 43, service agent 2 sends provider system 25 an instantiation request that specifies the ICI i4 selected by the previous service provider in the chain. Hence at step 44 service provider system 25 selects a connection path under the constraint that the path will actually end at egress interface i1. Similarly, at step 45, service provider system 25 sends an instantiation response that specifies both the selected ingress ICI, namely i1 and the selected resource identifier on the ingress ICI, namely ICR2.

At step 43, service agent 2 sends provider system 15 an instantiation request that specifies the ICI i1 selected by the previous service provider in the chain. Hence at step 44 service provider system 15 selects a connection path under the constraint that the path will actually end at egress interface i1.

The rest of the process, namely steps 46 and 47 can be executed identically to FIG. 2.

In a modification of the embodiment of FIG. 3, the instantiation step and activation step may be merged, e.g. for the sake of minimizing the number of messages exchanged between the service agent 2 and the service provider systems 15, 25 and 35. In that case, each service provider performs step 47 immediately after step 44, without waiting for an activation message from service agent 2. To do so, service agent 2 already includes the respective inter-carrier communication resource identifiers ICR2 and ICR3 in the instantiation requests sent at step 43 to service provider systems 25 and 15 respectively.

In an embodiment, in order to facilitate and/or speed up the step of instantiating a service element at step 44, a service provider can use a data repository in which a set of pre-computed connection paths embodying the respective service elements published by that service provider have been previously stored. Therefore, at step 44, the service provider system only needs to retrieve a pre-computed connection path matching the desired service element number. The pre-computation and storage of connection paths by a service provider is described in closer details in pending patent application FR2008055453 filed on 6 Aug. 2008. With some transport technologies, for example optical networks, it may take up to a few minutes to fully configure a connection segment across a resource domain. Therefore, relying on pre-computed and pre-established connection paths in some or all of the resource domains can save a substantial amount of time in the process of establishing an inter-carrier connection.

In embodiments, a connection segment in a resource domain is established as an MPLS or GMPLS Label Switched Path (LSP). Techniques known as LSP stitching can be used to concatenate multiple LSPs. In a corresponding embodiment, the edge node of a resource domain uses the inter-carrier communication resource identifier at step 47 to perform LSP stitching operations, so as to concatenate two adjacent LSPs. In this embodiment the inter-carrier communication resource identifier comprises an MPLS or GMPLS label. Service providers may define in advance a set of labels that may be used on an ICI for inter-carrier connections so as to improve resource management. Then, at step 44, the inter-carrier communication resource identifier can be chosen within the predefined set.

By transferring an inter-carrier communication resource identifier via the service layer between adjacent service provider systems, embodiments of the invention make it possible to concatenate connection segments without performing RSVP-TE signalling operations between edge nodes belonging to different service providers. Such transfer can be used at one or each of the inter-carrier hops of an end-to-end inter-carrier connection. Also, within one or each of the resource domains involved in an end-to-end inter-carrier connection, connection segment establishment may rely on intra-domain RSVP-TE signalling or other techniques, e.g. configuration by a domain-level network management device.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware 10 may represent several modules.

In the claims, any reference signs placed between parentheses shall not be construed as limiting the scope of the claims.

The invention claimed is:

1. A method for establishing a traffic-engineered connection across resource domains for data transport, each of the resource domains being owned by an associated service provider, the method comprising the steps of:
   determining, by a service agent, source and destination end-points for the connection;
   receiving, by the service agent, a service element from each associated service provider, the service element identifying edges of a resource domain owned by the associated service provider and connectivity attributes specifying connectivity provided by the associated service provider between the edges;
   determining, by the service agent, a chain of adjacent service elements suitable for joining the source and destination end-points based on the identified edges;
   requesting, by the service agent, a first service provider associated to a service element in the chain to select a first connection segment embodying the service element;
   receiving, by the service agent, an inter-carrier communication resource identifier from the first service provider, the inter-carrier communication resource identifier indicating communication resources at an inter-carrier interface between an end point of the first connection segment and a resource domain associated to an adjacent service element in the chain; and
   transferring, by the service agent, the inter-carrier communication resource identifier to a second service provider associated to the adjacent service element within a request to select a second connection segment embodying the adjacent service element in the chain.

2. The method in accordance with claim 1, further comprising the step of receiving, by the service agent, the inter-carrier communication resource identifier within a confirmation message to indicate an availability of the first connection segment.

3. The method in accordance with claim 1, further comprising the step of transferring, by the service agent, the inter-carrier communication resource identifier within an activation request to request the second service provider to establish a second connection segment embodying the adjacent service element.

4. The method in accordance with claim 1, wherein service element edges are identified as border nodes, the service agent determining the chain of adjacent service elements as a function of border node adjacencies.

5. The method in accordance with claim 1, further comprising the step of requesting, by the service agent in parallel, the first service provider associated to a service element in the chain and the second service provider associated to an adjacent service element in the chain to select respective connection segments between the border nodes identified in the respective service elements.

6. The method in accordance with claim 1, wherein service element edges are identified as neighbour resource domains.

7. The method in accordance with claim 6, wherein the second service provider selects the second connection segment as a function of the inter-carrier communication resource identifier so that the second connection segment ends at the inter-carrier interface indicated by the inter-carrier communication resource identifier.

8. The method in accordance with claim 1, wherein the first service provider selects the first connection segment within a set of pre-computed connection segments embodying the service element.

9. The method in accordance with claim 1, wherein the inter-carrier communication resource identifier comprises a Multi-Protocol Label Switching (MPLS) label or a Generalized MPLS (GMPLS) label.

10. The method in accordance with claim 1, further comprising the steps of:
determining, by the service agent, desired performance parameters for the connection; and
determining, by the service agent, the chain of service elements as a function of the connectivity attributes of the service elements so as to match the desired performance parameters.

11. The method in accordance with claim 1, wherein the service agent determines a service identifier for the connection and communicates the service identifier to the service providers associated to the service elements in the chain, and the service providers associate the service identifier to connection segments embodying the service elements.

12. A service agent for establishing a traffic-engineered connection across resource domains for data transport, each of the resource domains being owned by an associated service provider, the service agent comprising a processor adapted to:
determine source and destination end-points for the connection;
receive a service element from each associated service provider, wherein the service element identifies edges of a resource domain owned by the associated service provider and connectivity attributes that specify connectivity provided by the associated service provider between the edges,
determine a chain of adjacent service elements suitable to join the source and destination end-points based on the identified edges;
request a first service provider associated to a service element in the chain to select a first connection segment that embodies the service element;
receive an inter-carrier communication resource identifier from the first service provider, the inter-carrier communication resource identifier indicating communication resources at an inter-carrier interface between the first connection segment and a resource domain associated to an adjacent service element in the chain; and
transfer the inter-carrier communication resource identifier to a second service provider associated to the adjacent service element within a request to select a second connection segment embodying the adjacent service element in the chain.

13. A service provider system for a service provider owning a resource domain and participating in a service provider alliance to establish inter-domain connections through the resource domain, the service provider system comprising:
an interface to communicate with a service agent; and
a control device adapted to detect an instantiation request comprising a service element identifier and a service identifier, select a connection segment embodying the service element within the resource domain, select an inter-carrier interface at an end point of the connection segment, reserve a communication resource at the inter-carrier interface, and communicate an inter-carrier communication resource identifier that indicates the communication resources to the service agent in response to the instantiation request within a request to select a second connection segment embodying the adjacent service element in the chain.

14. A service provider system for a service provider owning a resource domain and participating in a service provider alliance to establish inter-domain connections through the resource domain, the service provider system comprising:
an interface to communicate with a service agent; and
a control device adapted to detect an activation request comprising an inter-carrier communication resource identifier and a service identifier, determine a connection segment associated to the service identifier, the connection segment disposed within the resource domain, and concatenate the connection segment with a communication resource at an inter-carrier interface indicated by the inter-carrier communication resource identifier within a request to select a second connection segment embodying the adjacent service element in the chain.

* * * * *